April 17, 1951 — A. G. PERKINS — 2,549,231
ALARM DEVICE FOR MILKING MACHINES
Filed March 17, 1947
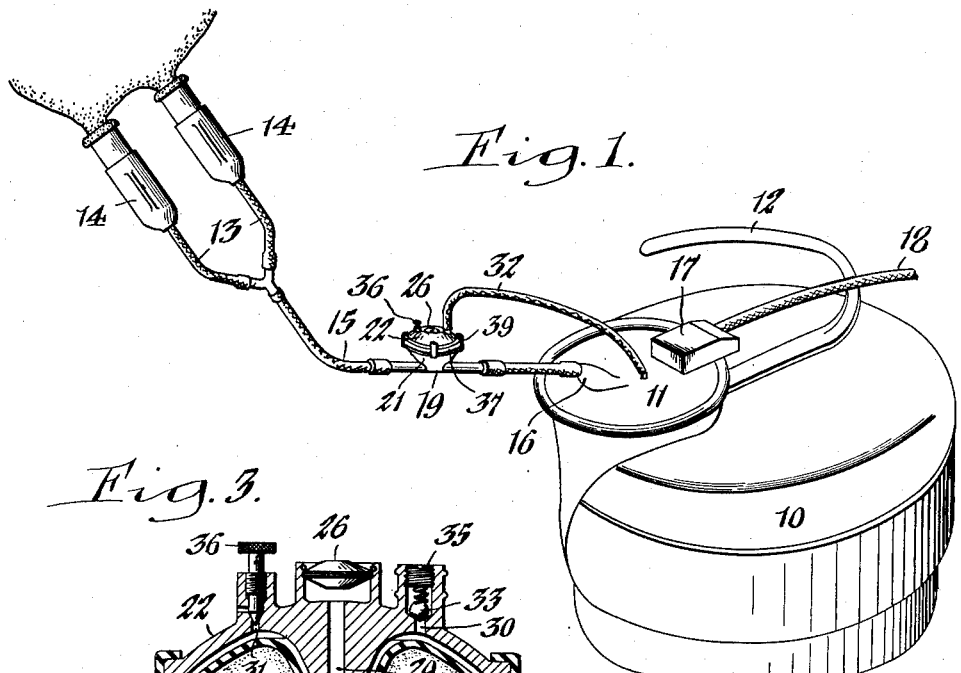
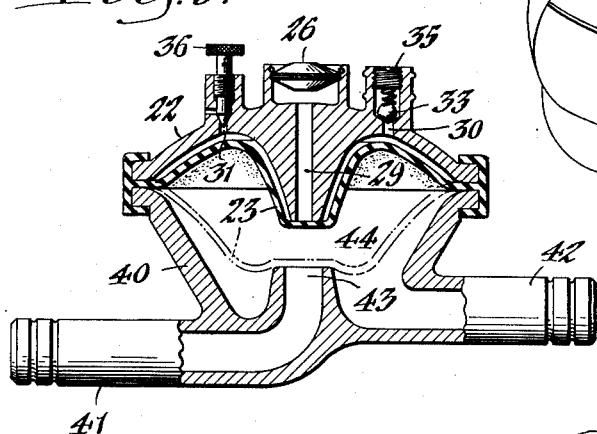
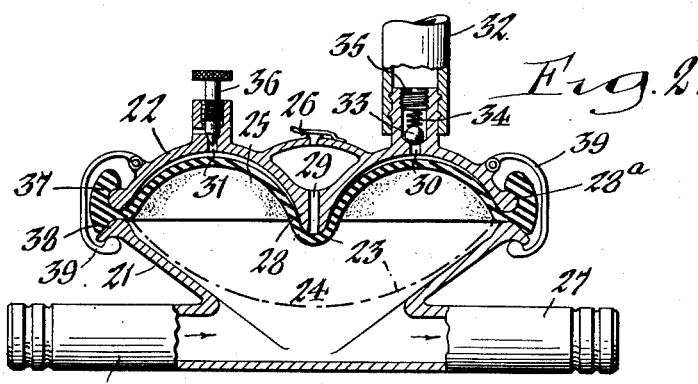
Inventor,
Alfred G. Perkins,
by Walter P. Guyer
Attorney.

Patented Apr. 17, 1951

2,549,231

UNITED STATES PATENT OFFICE 2,549,231

ALARM DEVICE FOR MILKING MACHINES

Alfred G. Perkins, Grand Island, N. Y.

Application March 17, 1947, Serial No. 735,278

12 Claims. (Cl. 119—14.08)

This invention relates generally to certain new and useful improvements in milking machine equipment but more particularly to a warning signal or alarm device for automatically indicating when the cow has been milked out or when the danger period has been reached in the milking operation.

It has for its object to provide a simple, compact and inexpensive device of this character which is so designed as to be readily interposed in the teat connections between the cow and the milk-receiving can and which will automatically sound an alarm at a predetermined time during the milking operation, thereby indicating to the dairy attendant that the milking machine should be disconnected.

Another object of the invention is to provide a milking machine appliance which is responsive to and governed by the vacuum employed in the operation of milking machines for not only sounding an alarm indicating that the cow has been milked out, but which will under such conditions cause the automatic release of the teat cups from the cow.

Other features of the invention reside in the construction and arrangement of parts hereinafter described and particularly pointed out in the appended claims.

In the accompanying drawings:

Figure 1 is a perspective view of a milking machine of ordinary construction showing my signal device associated therewith. Figure 2 is an enlarged cross section of the device shown in Figure 1. Figure 3 is a similar section of a modified form of the device.

Similar characters of reference indicate corresponding parts throughout the several views.

By way of example, I have shown my signal or alarm device applied to a milking machine of ordinary construction, 10 indicating the milk-receiving can having an operating top or cover 11 detachably applied to its upper end and adapted to be held firmly and tightly thereto by the vacuum employed in the milking operation. A handle or bail 12 is provided for facilitating its handle as well as for suspending it from the cow during the milking operation. The numeral 13 indicates the usual flexible conduits or connections having teat cups 14 at one end for detachable connection to the cow's teat while the other ends thereof may be connected by a common conduit 15 to an intake tube 16 formed on the top of the can-cover 11 or, if desired, the teat cup connections may be individually connected in like manner to the cover. Applied to the top of the cover is the customary pulsator 17 of the machine, the same being connected by a tube 18 with the suction-source.

For the purpose of preventing injury to the cow by leaving the milking machine on for too long a period, I provide a signalling or audible warning device which will be automatically rendered operative to sound an alarm when the milk flow from the cow is reduced below normal or, as said in dairy parlance, "when the cow has been milked out." While one of the devices or units indicated generally by the numeral 19, may be interposed in each teat connection, one has been shown, by way of example, as interposed in the common conduit 15 and in direct milk flow communication between the cow and the can and in suction communication with the machine through the tube 20.

In the preferred construction of the signalling device or unit it consists of a hollow or chambered body composed of opposing, separable sections 21, 22 made of metal or other appropriate material and detachably joined together in sealed relation in any suitable manner. These sections are so shaped in cross section to jointly define a chamber of substantially heart shape and are divided or separated by a displaceable flexible partition or diaphragm 23 to provide a milk flow chamber 24 and a vacuum control chamber 25 with which an audible alarm 26 is in governing communicating relation. This alarm is shown applied directly to the top of the body-section 22 and in the form of a whistle, although it may be otherwise mounted and may be in the form of a reed or the like. The companion body-section 21 has alining nipples 27 projecting therefrom to which the intake and outlet-branches of the milk flow conduit 15 are connected in the manner shown in Figure 1, whereby the milk drawn from the cow by the vacuum of the machine flows from the teat cup or cups to the lower body chamber 24 and thence to the can 10.

The upper or vacuum control, chamber-section 22 is dished in annular fashion to provide an axial or centrally-disposed, conical-like projection 28 which terminates in a plane slightly beyond the edge or rim 28ª of the companion chamber 25 and which has an axial port or passage 29 therein in operative relation at its outer end with the alarm 26 and over which the diaphragm 23 extends during the normal milking operation, as shown by full lines in Figure 2, to shut off such port and prevent the sounding of the alarm. Opening into the bottom or dished portion of the chamber 25 are ports or passages 30 and 31, respectively, the port 30 serving as a vacuum intake and connected by a tube 32 with the vacuum in the system, say to the cover 11, as shown in Figure 1. A check valve 33 is provided for controlling the vacuum port and a spring 34 serves to normally urge it inwardly to a closed position, while a screw 35 is provided for adjusting the tension of the spring to accordingly regulate the setting of the valve at the will of the operator to automatically effect its opening under differential vacuum conditions existing in the chambers 24, 25 at predetermined times during the milking operation. The port 31 functions as a vent, opening at its outer end into the atmosphere and having a needle or like regulating valve 36 fitted therein for adjusting it as desired. During the milking operation the check valve 33 performs a locking or retaining function, in that it causes the retention of the diaphragm 23 against the dished inner wall of the body-section 22 and over the whistle-governing port 29 to prevent its sounding, as shown by full lines in Figure 2, while the needle valve 36 acts to allow a slow leakage of air into the chamber 25 and tends to effect the release of the diaphragm at a predetermined time and open the whistle-governing port to sound the alarm.

The diaphragm 23 is adapted to be detachably disposed between the body-sections 21, 22 and serve as a sealing element therefor, and for this purpose terminates at its periphery in an annular flange 37 extending above and below the surface of the diaphragm. The upper portion of this flange snugly grips the rim 28 of the body-section 22 while the lower flange thereof fits in flaring fashion to the rim 38 of the companion body-section 21. The latter is in turn detachably retained in place by spring clips 39 hinged to the companion section and whose free ends hook beneath the undercut portion of the rim 38 in the manner shown in Figure 2. This construction enables the lower or milk-flow section 21 of the unit to be readily detached for cleaning and sterilizing by merely uncoupling the clips 39 without disturbing the diaphragm. The latter may, however, be readily removed from the companion section when desired.

In operation, assuming the milking machine to be connected to the cow and the milk to be flowing in a normal stream and in a pulsating fashion to the milk-receiving can, the diaphragm assumes the position shown by full lines in Figure 2 where it is closed across the alarm-governing port 29. During this period the vacuum in the milk-flow chamber 24 fluctuates substantially to and below the normal vacuum in the system, while the vacuum in the control chamber 25 is at a constant value determined by the setting of the check valve and for example, may have a value of approximately 11 inches. With the surging of milk from the cow into the unit there is a reduction of the vacuum in the chamber 24 below normal and during this cycle the check valve opens and acts to retain the diaphragm against the dished wall of the chamber. As the cow is gradually milked out and the flow of milk through the unit is reduced, the vacuum in the milk-flow chamber 24 is restored to a constant value of about 14 inches and the resulting difference in vacuum in the respective chambers 24 and 25, plus the admission of atmosphere through the vent port 31, causes the diaphragm to collapse into the chamber 24 and open the whistle-governing port 29 to render the sounding of the alarm 26, thereby notifying the attendant that the machine should be disconnected from the cow. When there is a variance in the vacuum in the lower or milk-flow chamber, the alarm does not function. When the vacuum is constant in such chamber then the alarm is sounded.

In the modified form of the invention shown in Figure 3, the device is substantially the same as that heretofore described, the only structural change being in the milk-flow chamber section. The latter, indicated by the numeral 40, has a milk intake passage 41 and an outlet passage 42, the former terminating in a port 43 rising into the milk flow chamber 44 axially thereof and in alinement with the whistle-control port 29. When the diaphragm 23 is collapsed to render the alarm operative, it closes over the mouth of the milk intake port 43, thereby shutting off the vacuum at the companion teat cup or cups and causing it or them to drop by gravity from the cow's teat or teats.

I claim as my invention:

1. The combination with a milking machine having a teat connection for conducting the milk by vacuum from the cow to a milk receiving can, of a self-contained, vacuum-responsive unit interposed in said connection and including a movable partition defining a milk flow chamber and a vacuum control chamber, and an alarm device in operative relation to said vacuum control chamber and rendered operative by a difference in vacuum present in said chambers when the flow of milk through the unit is reduced to a predetermined minimum.

2. The combination with a milking machine having a teat connection for conducting the milk by vacuum from the cow to a milk receiving can, of a vacuum responsive unit interposed in said connection and including a movable partition defining a vacuum control chamber and a milk flow chamber through which the milk is adapted to flow, and an alarm device applied to said unit in operative relation to said control chamber and rendered operative in response to a differential of the vacuum in said chambers caused by a reduction in the flow of milk through said milk flow chamber to a minimum.

3. The combination with a milking machine having a teat connection for conducting the milk by vacuum from the cow to a milk receiving can, of a vacuum governed unit interposed in said connection and including a milk flow chamber through which the milk flows from the cow to the can, a vacuum control chamber communicating with a source of vacuum, an alarm applied to said unit in operative relation with said control chamber, and means disposed in correlation to said chambers and responsive to the difference in vacuum therein for automatically rendering the alarm operative when the cow is milked out and the milk flow through the unit is reduced to a minimum.

4. The combination with a milking machine having a teat connection for conducting the milk by vacuum from the cow to a milk receiving can, of a vacuum-governed unit interposed in said connection including a milk flow chamber through which the milk flows from the cow to the can and a vacuum control chamber communicating with the source of vacuum, an alarm in operative relation to said control chamber, and a diaphragm separating said chambers and responsive to the change of vacuum therein as determined by the flow of milk to render the alarm operative or inoperative.

5. The combination with a milking machine having a teat connection for conducting the milk by vacuum from the cow to a milk receiving can, of a vacuum-governed unit interposed in said connection including a milk flow chamber through which the milk flows from the cow to the can and a vacuum control chamber communicating with the source of vacuum, said control chamber having a port opening therein, an alarm in operative communication with said chamber-port, and a diaphragm separating said chambers and in governing relation to said port and responsive to the change of vacuum therein as determined by the flow of milk therethrough to render the alarm operative or inoperative.

6. The combination with a milking machine having a teat connection for conducting the milk by vacuum from the cow to a milk receiving can, of a vacuum-governed unit interposed in said connection including a milk flow chamber through which the milk flows from the cow to the can and a vacuum control chamber communicating with the source of vacuum, a valve in fluid communication with said control chamber for regulating the vacuum pressure therein, a vacuum-operative alarm in operative relation to said control chamber, and means in said unit and responsive to the change of vacuum therein as determined by the flow of milk therethrough to render the alarm operative or inoperative.

7. The combination with a milking machine having a teat connection for conducting the milk by vacuum from the cow to a milk receiving can, of a vacuum-governed unit interposed in said connection including a milk flow chamber through which the milk flows from the cow to the can and a vacuum control chamber communicating with the source of vacuum, said control chamber having a port opening therein, a valve in fluid communication with said control chamber for regulating the degree of vacuum therein, a vacuum-operated alarm in operative communication with said chamber-port, and a vacuum-influenced diaphragm separating said chambers and displaceable by the difference in vacuum therein to and from closing relation with said port to render the alarm, respectively, inoperative or operative.

8. In a device of the character described, a hollow body composed of opposing chamber-forming sections adapted to be detachably coupled in sealed relation, one of said sections having a passage therethrough for interflow communication with a vacuum conduit and the other having a signal-controlling port therein opening into the atmosphere, a second port in said other section adapted for communication with a source of vacuum, a vacuum-responsive diaphragm disposed between said sections and separating the chambers thereof and in governing relation to said signal-controlling port, a normally-closed check valve in said second port, and means for venting the ported chamber.

9. In a control unit adapted to be interposed in the teat connection of a milking machine, comprising a hollow body having a flexible diaphragm therein dividing the same into opposing chambers, one chamber being in direct milk-flow communication with the teat connection and the companion chamber being adapted for connection to a source of vacuum, said last-named chamber having a substantially axially-disposed port therein and over the inner end of which said diaphragm is adapted to extend to close the same during normal milk flow conditions and from which the diaphragm is removed to open said port under reduced milk flow conditions, and a vacuum-operated alarm in operative communication with the outer end of said port.

10. In a control unit adapted to be interposed in the teat connection of a milking machine, comprising a hollow body having a flexible diaphragm therein dividing the same into opposing chambers, one chamber being in direct milk-flow communication with the teat connection and the companion chamber being adapted for connection to a source of vacuum, said last-named chamber having a substantially axially-disposed port therein and over the inner end of which said diaphragm is adapted to extend to close the same during normal milk flow conditions and from which the diaphragm is removed to open said port under reduced milk flow conditions, a vacuum-operated alarm in operative communication with the outer end of said port, and vent and vacuum ports in said last-named chamber, the vacuum port communicating with the source of vacuum and having an adjustable spring-urged check valve therein and the vent having an adjustable needle valve therein.

11. In a control unit adapted to be interposed in the teat connection of a milking machine, comprising a hollow-body composed of opposing chamber-forming sections adapted to be detachably coupled in sealed relation and having a flexible diaphragm therein separating the sections to define milk flow and vacuum control chambers, the milk-flow, chamber-forming section being in direct communication with the teat connection and including a substantially axially-disposed ported projection extending part way into the same and over which the diaphragm is adapted to extend in one position thereof to close such port, the vacuum control, chamber-forming sections being adapted for connection to a source of vacuum and having a similar ported projection therein in opposing alinement with that of the milk-flow chamber section and with the port thereof opening at its outer end into the atmosphere while its inner end is adapted to be closed by the diaphragm during normal milk-flow conditions, and a vacuum-operated alarm applied to said last-named, chamber-forming section in operative communication with the diaphragm-governed port thereof.

12. In a control unit adapted to be interposed in the teat connection of a milking machine, comprising a hollow body composed of opposing chamber-forming sections adapted to be detachably coupled in sealed relation and having a flexible diaphragm therein separating the sections to define milk flow and vacuum control chambers, the milk-flow, chamber-forming section being in direct communication with the teat connection and including a substantially axially-disposed ported projection extending part way into the same and over which the diaphragm is adapted to extend in one position thereof to close such port, the vacuum control, chamber-forming section being adapted for connection to a source of vacuum and having a similar ported projection therein in opposing alinement with that of the milk-flow chamber section and with the port thereof opening at its outer end into the atmosphere while its inner end is adapted to be closed by the diaphragm during normal milk-flow conditions, said last-named section having a check-valve controlled port connected to the source of vacuum and a valve-controlled vent opening into the atmosphere, and a vacuum-operated alarm applied to said last-named, chamber-forming section in operative communication with the diaphragm-governed port thereof.

ALFRED G. PERKINS.

REFERENCES CITED

The following references are of record in the file of this patent:

UNITED STATES PATENTS

| Number | Name | Date |
|---|---|---|
| 644,179 | Klein et al. | Feb. 27, 1900 |
| 1,195,998 | Leitch | Aug. 29, 1916 |
| 1,203,551 | Mintz | Oct. 31, 1916 |
| 2,102,275 | Martin | Dec. 14, 1937 |

FOREIGN PATENTS

| Number | Country | Date |
|---|---|---|
| 494,965 | Germany | Apr. 3, 1930 |
| 59,661 | Denmark | Mar. 30, 1942 |